A. ROBERTS.
BY-PRODUCT RECOVERY APPARATUS.
APPLICATION FILED SEPT. 7, 1915.
1,366,494.
Patented Jan. 25, 1921.
2 SHEETS—SHEET 1.
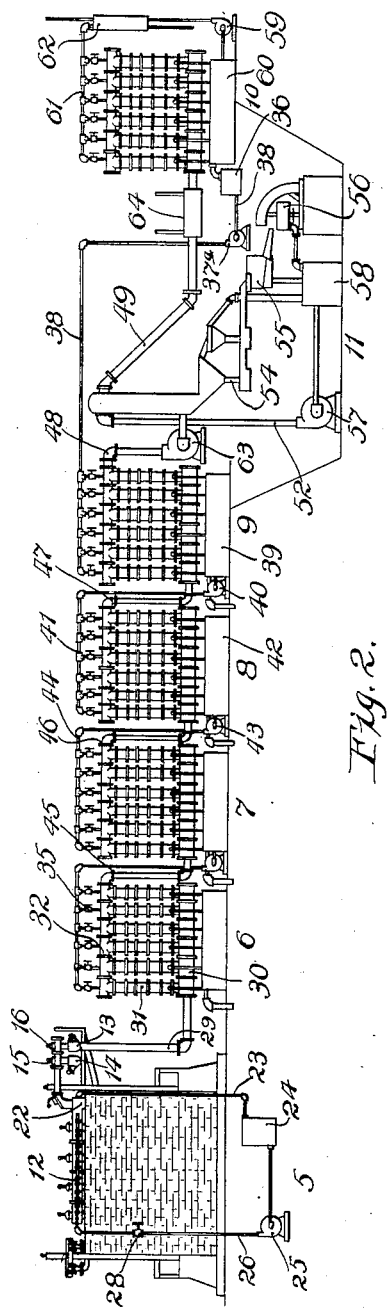

A. ROBERTS.
BY-PRODUCT RECOVERY APPARATUS.
APPLICATION FILED SEPT. 7, 1915.

1,366,494.

Patented Jan. 25, 1921.
2 SHEETS—SHEET 2.

Witness:
Harry S. Gaither

Inventor
Arthur Roberts
by
Attys.

UNITED STATES PATENT OFFICE.

ARTHUR ROBERTS, OF EVANSTON, ILLINOIS, ASSIGNOR, BY MESNE ASSIGNMENTS, TO AMERICAN COKE & CHEMICAL COMPANY, OF CHICAGO, ILLINOIS, A CORPORATION OF MAINE.

BY-PRODUCT-RECOVERY APPARATUS.

1,366,494.   Specification of Letters Patent.   Patented Jan. 25, 1921.

Original application filed April 17, 1915, Serial No. 22,147. Divided and this application filed September 7, 1915. Serial No. 49,250.

*To all whom it may concern:*

Be it known that I, ARTHUR ROBERTS, a citizen of the United States, residing at Evanston, county of Cook, and State of Illinois, have invented certain new and useful Improvements in By-Product-Recovery Apparatus, of which the following is a specification.

The present invention has reference to certain improvements in apparatus for the recovery of by-products from coke oven distillate. The apparatus to which the present invention relates is flexible to the extent that it may be used for the recovery of all of the hydro-carbon by-products, which are ordinarily recovered from distillate coal gases either in gaseous, liquid, or solid form. The apparatus herein disclosed is shown and described in my co-pending application for Letters Patent of the United States on improvements in by-product recovery processes, Serial No. 22,147, filed April 17, 1915, and this application is a division of the said application.

In the destructive distillation of coal, the distillate gases carry a large number of products in gaseous or vaporous form. Some of these products can be brought into either liquid or solid form and will retain their respective forms at atmospheric temperature after having been cooled down to temperature below their dew points. Each product will separate itself at its dew point from the homogeneous mixture of all of the coal gas distillates.

There are some gaseous or vaporous elements in coal distillate gases which are not condensed and liquefied or solidified by the reduction of temperature. Such for example are ammonia ($NH_3$), sulfur dioxid ($SO_2$), and cyanogen ($CN$) which require chemical reaction with other elements to put them into commercial forms that they are stable at atmospheric temperatures. The different constituent gases or vapors contained in the distillate gas are associated in the form of a mixture, and as long as the temperature of the distillate gas is maintained high enough all of the constituents of this mixture will remain in gaseous form. If, however, the temperature of the mixture be reduced below the dew point of any of the constituents, then such constituent will be precipitated in the form of a liquor or oil if the mixture be saturated with such constituent and be in proper condition. Thus the particular constituent in question can be separated or removed from the remaining constituents. Having thus removed one of the constituents from the mixture, another constituent having a lower dew point may be removed by another further reduction of temperature to its particular dew point, provided it likewise be present in sufficient quantity and condition to saturate the mixture. In this way the several constituents may be fractionally precipitated, and the fractionates may be separately recovered.

As the gases come off from the carbonizing chamber they may or may not carry the several constituents in those proportions desirable for the proper fractional precipitation or condensation. If the constituents are not all present in the proper quantities or proportions, then they cannot be as successfully precipitated at the desired points in the cycle of treatment as by the use of the process and apparatus herein described. By this is meant that the several reductions of temperature at the several points of the cycle of treatment may not result in the desired fractional condensation of the desired constituents.

From the above, it appears that the preliminary treatment of the gases is of great importance to their successful economic treatment later on in the process of fractional condensation. One of the objects of the present invention is to provide an apparatus to so handle the gases as they come off from the carbonizing chamber, that they will be in the best possible condition for their subsequent treatment in the fractional condensation process. In this connection, another object is to provide an apparatus to subject the gases immediately after coming off from the carbonizing chamber to a preliminary treatment for the purpose of placing them immediately in the best possible condition of saturation, as far as the several constituents are concerned, so that each of said constituents can subsequently be successfully and completely removed by fractional condensation. This feature of the invention consists, in one form of treatment, in providing means for injecting into the newly delivered mixture an oil or emulsion so constituted, and in such quantities, that the vaporization of this oil or emulsion will serve to bring the distillate gas into the desired conditions of temperature and saturation of the several constituents.

Another feature of the invention has reference to the apparatus used in the treatment or handling of the gases during the succeeding steps of fractional condensation. This feature of the invention has for its object the arranging of the several condensation steps in such form and order that the various constituents may be brought down in the order of their dew points, and without the necessity of any reheating whatsoever. In this connection, another object is to so place the ammonia extractor, when one is used, that the ammonia likewise may be removed at such a point in the process that any subsequent constituents, such as benzol and the like, may be thereafter taken off without the necessity of reheating or auxiliary treatment of this kind.

Another object of the invention has reference to the provision of an apparatus for securing such treatment of the gases as to result in a conservation of the heat with the greatest possible efficiency, so that the introduction of outside heat energy will not be necessary during the entire cycle of treatment.

Other objects and uses of the invention will appear from a detailed description of the same which consists in the features of invention and various steps of process hereinafter described and set forth.

In the drawings, I have illustrated one combination of apparatuses for carrying into effect my process, as well as a complete arrangement of mechanisms or devices for treating the gas from step to step. It will be understood, however, that the particular mechanical construction of parts illustrated is not necessarily essential to the successful prosecution of the process, nor to the combination of elements disclosed and claimed herein, inasmuch as other forms of mechanisms may be adopted.

In the drawings:

Figure 1 illustrates in side elevation diagrammatically a group of elements for prosecuting the successive steps of the process, the elements therein illustrated, including the take-off for the coke oven, four condensers, an ammonia saturater, and a fifth condenser for a subsequent step of the process. It will be understood, however, that, as far as the features of the invention are concerned, a different number of condensers may be used, or the ammonia saturater may be dispensed with, or different forms of condenser and saturater may be substituted;

Fig. 2 shows an enlarged detail of one form of dome for the preliminary treatment of the gases;

Figure 4:
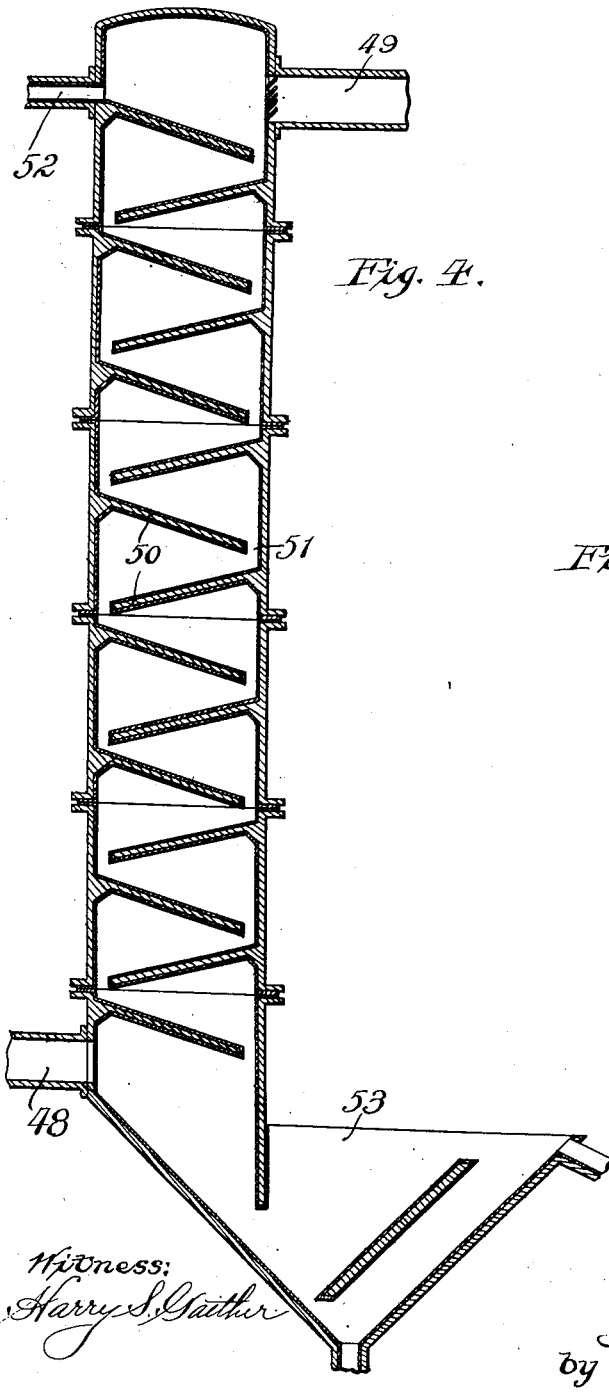
Fig. 4 shows in enlarged detail a section through one form of ammonia saturater for the treatment of the gases.

I will first describe briefly the process itself and will then describe more in detail the process as the same may be carried out by means of the several mechanisms or apparatuses and the combination thereof illustrated in the drawings.

As the gases come off from the carbonizing chamber, they are immediately treated with a spray of oil or emulsion of desired composition according to the constituents which it is desired to introduce into the gas. This oil or emulsion may be sprayed directly into a dome header between the gas ports of the carbonizing chamber and the mains. These mains are for the collection of the gases from the various ovens of the bench. During the run of each oven the composition of its gases changes, being rich at the commencement of the run and gradually becoming leaner as the run progresses. I may, therefore, provide two mains and two or more sets of by-product apparatus so that at an appropriate point in the carbonizing cycle the gas may be switched over from one set of by-product apparatus to the other set.

The composition of the emulsion or oil, which should be sprayed into the newly delivered gas, will be determined largely by the composition of the gas as delivered from the carbonizing chamber, and by the constituents or components which it is desired to recover. This oil or emulsion is sprayed into the gas in sufficient quantities to saturate the gas and to reduce the gas temperature to a point somewhat above the dew point of the heaviest constituent to be recovered.

After the gas which has been subjected to this preliminary treatment leaves the main, through which it is flowing, it enters the first condenser whose function is to bring down or precipitate the heaviest oil or constituent which it is desired to recover. In this condenser, the up-flowing gas is subjected to a counter current flow of an oil or emulsion at such temperature and in such quantities as to lower the temperature of the gas to the dew point, or slightly below the dew point of the constituent which is to be brought down. For this purpose, I may use the oil or constituent which is brought down in the next succeeding condenser. This oil has a dew point below that of the constituent being brought down in the first condenser, and, therefore, this second oil, when so injected, will be vaporized and passed over with the gas into the second condenser, the temperature of the gas being simultaneously reduced to the dew point of the first constituent. In other words, the heat abstracted from the gas for the purpose of lowering its temperature to the dew point of the first constituent is absorbed by the second oil so injected, serving to heat said oil and being absorbed as the latent heat of vaporization of the second oil so injected. For this reason, the second oil will not be mixed with the first constituent as the latter is brought down, but said second oil will vaporize and be carried over with the gas into the second condenser.

In the second condenser, the up-flowing gas is subjected to a downwardly moving spray of oil from the third condenser, the dew point of the constituent taken off in the second condenser being higher than that of the constituent taken off in the third condenser. Here likewise the oil from the third condenser will reëvaporate in the seceond condenser and pass over to the third condenser where it will be brought down by an oil spray from the fourth condenser.

From the foregoing, it appears that the cooling of the gas current is effected by successive steps or stages, so as to successively bring down the constituents desired, and that each cooling may be accomplished by an oil of a succeeding step. By the use of this arrangement or process the various constituents may be successively brought down without the necessity of reheating the gas at any stage of the process, and without the necessity of diluting or adulterating it by the injection of oils or constituents not contained within its body and the recovery of which is not desired.

Another feature of this invention consists of the ability to maintain the temperature of the pipes and passages throughout the apparatus at the same temperature as the gases circulating through them, by the use of jackets in which are circulated hot or cold oils or liquors, according to the requirements in each respective stage of the recovery and separation of the staple products to be received from the distilled coal gas. By the use of this feature, the pipes and passages can be maintained at the same temperature at each point as the desired temperature of the gases at such point. Therefore, another feature of the invention consists in the provision of apparatus for maintaining the temperature of the pipes or passages of each condenser as nearly as may be at the dew point of the constituent to be brought down in such condenser, thereby preventing the aforementioned deposit of tarry material, and simutaneously insuring a very uniform precipitating action throughout the body of the gas current.

When the ammonia is to be extracted by the use of a saturater for the production of ammonium sulfate, the temperature of the gas entering the saturater should ordinarily be lower than that for the precipitation of any other constituent except benzol. Ordinarily, therefore, the ammonia saturater will be placed beween the benzol condenser and the condenser for the next preceding constituent. The saturater is shown as being placed between the condenser No. 9 and condenser No. 10 because the gas entering the saturater should have a temperature above the dew point of water vapor to prevent the precipitation of water in the sulfuric acid. In other words, the gas should be discharged from the top of the saturater 54 at a temperature above the dew point of water vapor or above that temperature at which the steam or water vapor will condense.

Referring now to Fig. 1, the coke oven is designated by the numeral 5. In said figure, I have illustrated five condensers designated respectively 6, 7, 8, 9, and 10, and I have also illustrated an ammonia saturating plant.

The gas coming off from each oven is collected in a dome or header 12, whence it flows to either of the mains 13 or 14 depending upon the positions of the valves 15 and 16. One of these mains is for the richer gases and the other is for the leaner gases. The recovery plant will ordinarily be in duplicate, one set of apparatus being connected to the main 13 and the other set to the main 14. However, for purposes of simplification, I have illustrated only one set of recovery apparatus, the same being connected to the main 13.

Referring to Fig. 2, it will be noted that there are provided the pipes 17 and 19 along the sides of the dome 12. Each of these pipes connects to a plurality of spray nozzles 20 located throughout the length of the dome, said nozzles serving to deliver the oil or emulsion to the gas as the same rises through the ports 21 from the carbonizing chamber into the dome. Ordinarily some of the spray will not be volatilized in the gas, but will collect in the dome, whence it will flow to a trap 22 from which it will be returned through the pipe 23 to the receptacle 24. From this receptacle the emulsion is circulated to the pipes 17 and 19 by means of the pump 25 delivering the oil or emulsion through the pipe 26. The valves 27 serve to regulate the flow of oil to the several nozzles, and a valve 28 serves to control the delivery of oil through the pipe 26 to the entire dome. It thus appears that the volume of oil, as well as its distribution in the dome, can be controlled as well as insuring the return of any excess oil back to the receptacle for recirculation.

The details and construction of the dome 12 are fully disclosed in a co-pending application for Letters Patent of the United States on improvements in coke oven take-offs, executed by me April 14, 1915, filed April 17, 1915, as Serial No. 22,145.

From the main 13, the gas flows by way of a connection 29 to the manifold 30 in the lower portion of the first condenser. Each condenser is conveniently illustrated as being provided with a plurality of vertical columns 31 leading from the lower manifold 30 to an upper manifold 32. While I have shown in Fig. 3 certain details of the construction of this condenser, other details of its construction will be found in my copending application for Letters Patent of the United States on improvements in by-product condensers, executed by me April 13, 1915, filed April 17, 1915, as Serial No. 22,146. The volume of gas passing upward from the lower manifold of each condenser to the upper manifold thereof is controlled by the valves 33 located at the lower ends of the columns 31. By means of these valves the amount of gas passing up through each column can be regulated according to requirements. Adjacent to the upper end of each column is a spray nozzle 34 whereby the oil or constituent to be used in the precipitating operation is introduced to that particular column. The valves 35 serve to control the flow of oil from the various nozzles 34. Across the lower portion of each column 31 is a partition 36 on the upper surface of which collects the precipitate, whence it is withdrawn through the port or opening 37.

Considering condenser No. 10, all of the oil brought down in the same collects in a receptacle 36. A portion of this oil is drawn by a pump 37ª through a pipe 38 and delivered to the nozzles of condenser No. 9. In said condenser it serves to precipitate the oil being brought down in condenser No. 9 and is itself reëvaporated. In condenser No. 9, the oil brought down is collected in a receptacle 39. From this receptacle a pump 40 delivers a portion through the pipe 41 to the nozzles of condenser No. 8. This oil in turn serves to precipitate the oil in condenser No. 8 and is itself reëvaporated and passes back to condenser No. 9. The oil brought down in condenser No. 8 collects in the receptacle 42, whence a portion is drawn by the pump 43 and delivered through the pipe 44 to the nozzles of condenser No. 7. The action in condensers Nos. 7 and 6 is similar to that just described for condensers 10, 9 and 8.

After the gas has been treated in condenser No. 6, it flows by the connection 45 to the lower manifold of condenser No. 7. From the upper manifold of condenser No. 7, it passes by the connection 46 to the lower manifold of condenser No. 8, and from the upper manifold of condenser No. 8 by the connection 47 to the lower manifold of condenser No. 9.

From the condenser No. 9 the gas passes by the connection 48 to the ammonia saturater 11. The construction of this saturater is shown in Fig. 4, but the other details of its construction are more fully shown in my copending application for Letters Patent of the United States on improvements in ammonia saturaters, executed by me April 14, 1915, filed April 17, 1915, as Serial No. 22,144. In the said saturater the gas enters at the lower end and passes up to a discharge connection 49 at its upper end. A series of baffles 50 extend across the saturater from its opposite sides, said baffles slanting downward in opposite directions. Adjacent to the lower end of each baffle is the relatively small opening 51. The acid is introduced through the connection 52 at the upper end of the saturater, flowing downwardly over the successive baffles and being ultimately discharged into the hopper 53. The volume of acid is preferably adjusted so as to substantially close the openings 51, so that the up-flowing gas is forced to break through the acid at each of said openings. The ammonium sulfate crystals collect in the hopper whence they may be withdrawn through the connection 54, ultimately finding their way to a drain table 55 and centrifugal 56. A pump 57 circulates the acid from the receptacle 58 up through the pipe 52 and into the saturater.

The condenser 10 is provided with a pump 59 which draws oil from the receptacle 36 or from the auxiliary receptacle 60, delivering the same through the pipe 61 to the nozzles of that condenser. In order to bring the oil so delivered to the nozzles of the condenser 10 to the proper temperature, I have illustrated a cooler 62 surrounding the pipe 61 throughout a portion of its length, said cooler bringing the oil to the desired temperature before the same is delivered to the nozzles of this condenser. Ordinarily the temperature desired will be below 18° C. It is generally desired to reduce the temperature of both gas and circulating oil used for cooling the gas in condenser No. 10 below the temperature of the condensation of water and a greater efficiency is obtained in the recovery of the light oils in condenser No. 10.

In order to insure a proper flow of gas through the saturater ordinarily, there will be provided an exhauster 63 in the connection 48 which leads from condenser No. 9 to the saturater, and ordinarily also a cooler 64 will be installed in the connection 49 between the saturater and condenser No. 10. It will be understood that the temperature at which benzol will be precipitated is considerably below that of the ordinary atmosphere.

Figure 3:
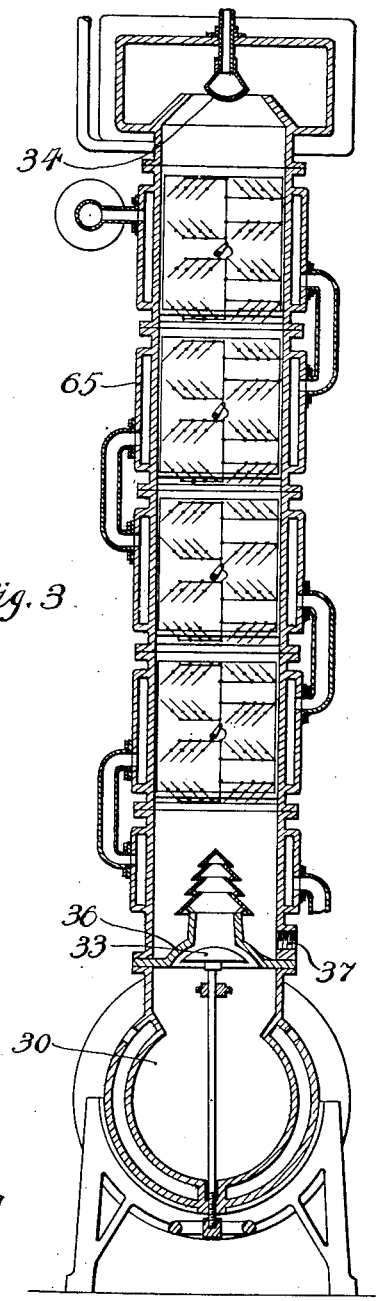
Fig. 3 shows in enlarged detail a section through one form of condenser for the treatment of the gases.

In Fig. 3, it will be noted that each of the condenser sections is provided with a jacket 65. When it is desired to secure a more perfect operation of the apparatus and process a suitable liquor may be circulated through the jackets of each condenser so as to maintain said condenser at the proper temperature. While I have not illustrated in detail such circulating mechanism in the diagram of Fig. 1, still it will be understood that the condensers illustrated in said diagram may be provided with the jackets illustrated in Fig. 3 and the accompanying circulating mechanism or not as desired.

The number, character, and composition of the oils separated will depend upon the number of fractional precipitation stages, the temperature maintained at each stage, the constituents contained in the distillate gases, etc. Ordinarily the distillate oils are classified as heavy, middle, and light. The heavy oils which usually include anthracene, pyrene, and picene come off between 230° and 520° C.; the middle oils which usually include carbolic acid, naphtha solvent, creosote, and naphthalene come off at from 170° to 230° C., and the light oils which usually include benzol, toluol, and xylol come off below 170° C.

As an example of a process embodying the features of my invention, let it be assumed that picene, anthracene oil, creosote, carbolic acid, and benzol are to be recovered. There will be provided five condensers, one for each of these constituents. The temperature maintained in each condenser will be appropriate for bringing down the particular constituent for which that condenser is intended. As the distillate gases leave the carbonizing chamber they will immediately be treated to a tarry emulsion composed in general of a mixture of the constituents to be recovered, and in amount suitable to effect a reduction of distillate gas temperature to a point somewhat above the dew point of the heaviest constituent. It will, of course, be understood that in any given installation, the composition of the emulsion will be determined according to the products which are to be recovered, and according to the composition of the distillate gases themselves, but ordinarily the emulsion will comprise a mixture of the constituents which are to be recovered at the various stages of the fractional condensation process.

In many cases, however, a different material may be injected into the gas in the preliminary treatment of the same. For example, in some cases, it may be found sufficient to inject water supply for the purpose of somewhat cooling the gas.

I claim:

1. By-product recovery apparatus or the like comprising in combination means for injecting into the body of the raw gas from the ovens an emulsion of desired constituents for the purpose of placing said gas in desired condition of saturation of certain of its constituents, a series of spray condensers, means for connecting said condensers in succession with each other to thereby cause the gases to pass through them in succession, means for delivering to the first one of said series gas from said injecting means, an acid ammonia saturater, means for delivering to the same gas from the last one of said series, and another spray condenser, and means for delivering to the same gas from the acid ammonia saturater, each of said spray condensers having in its lower portion a trap for the collection of condensed oil, and connections from said traps for the return from each trap of oil therefrom to the spray of the condenser of higher order in the series, and a cooler for the oil of the trap of the last condenser of the series, substantially as described.

2. By-product recovery apparatus or the like comprising in combination means for injecting into the body of the raw gas from the ovens an emulsion of desired constituents for the purpose of placing said gas in desired condition of saturater of certain of its constituents, a series of spray condensers, means for connecting said condensers in succession with each other to thereby cause the gases to pass through them in succession, means for delivering to the first one of said series gas from said injecting means, each of said spray condensers having in its lower portion a trap for the collection of condensed oil, and connections from said traps to the condensers for the delivery to the spraying means of each condenser of oil precipitated in a subsequent condenser of the series, and a cooler for the oil of the trap of the last condenser of the series, substantially as described.

3. By-product recovery apparatus or the like comprising in combination a series of spray condensers each having on its interior a spraying means for delivering spray to the gas flowing through said condenser, means for delivering to the first condenser of the series gas from a retort, means for connecting said condensers in succession to thereby cause the gas to pass through them in succession, each of said spray condensers having in its lower portion a trap for the collection of oil from said condenser, overflow connections in the upper portions of said traps for the overflow of oil from them, and connections from the traps at points below said overflow connections for the delivery from each trap of a portion of its oil to the spraying means of the next preceding condenser of the series, substantially as described.

4. By-product recovery apparatus or the like, comprising in combination a series of spray condensers each having in its interior spraying means for delivering spray to the gas flowing through said condenser, means for connecting said condensers in succession to thereby cause the gas to pass through them in succession, means for collecting oil precipitated in each condenser, and means for returning from each such collecting means to the spraying means of a preceding condenser, oil from said collecting means, substantially as described.

ARTHUR ROBERTS.

Witnesses:
 THOMAS A. BANNING, Jr.,
 EPHRAIM BANNING.